Oct. 28, 1941.    C. SCHRAMM    2,260,540
COLLATING MACHINE
Filed April 28, 1941    13 Sheets-Sheet 1
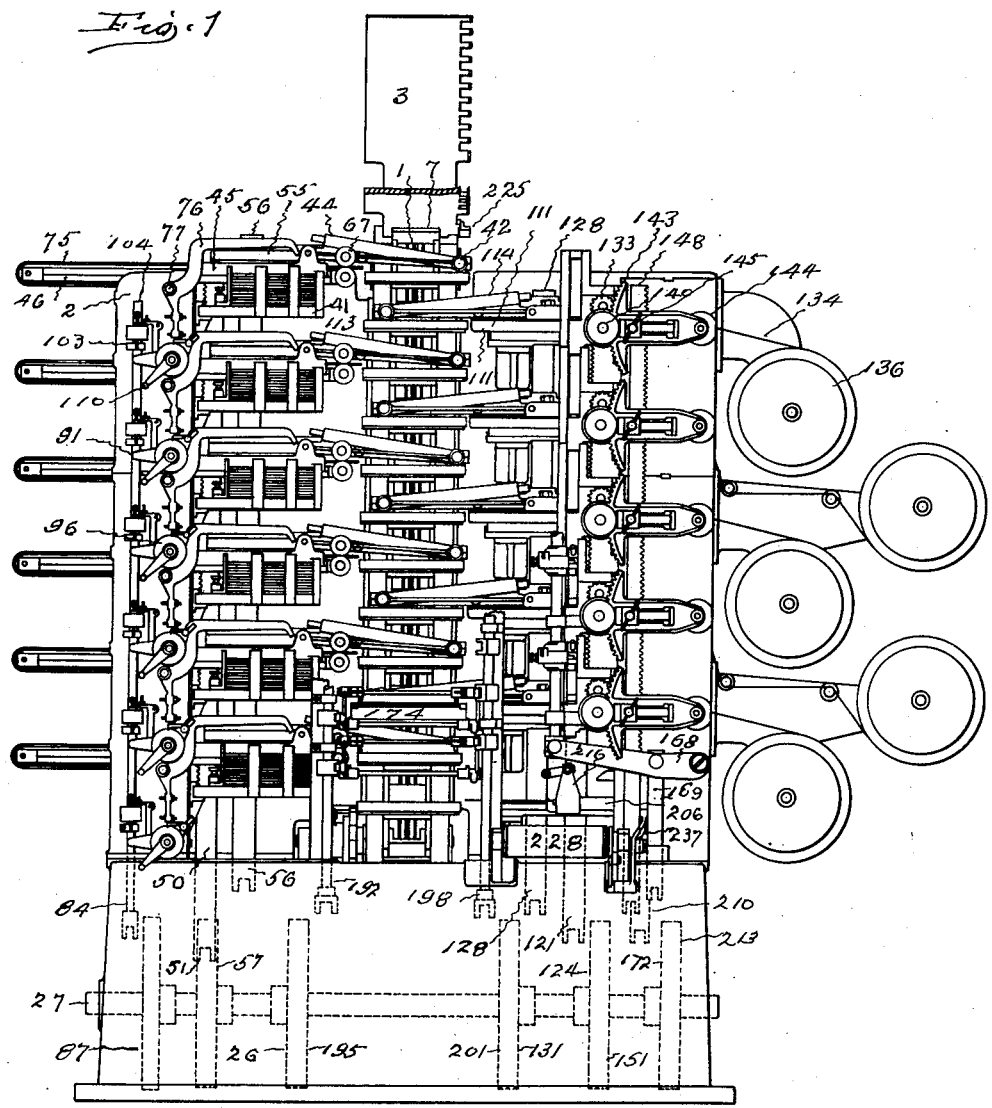
INVENTOR
Carl Schramm by
Harry P. Williams
atty.

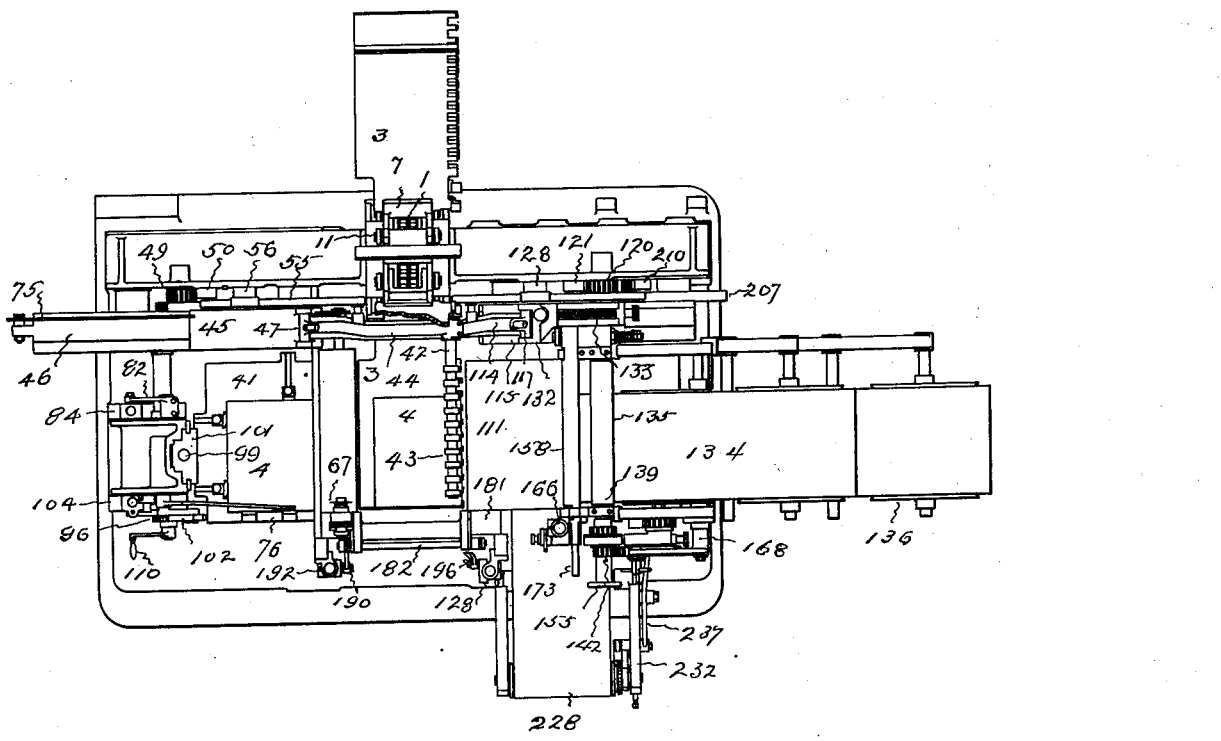

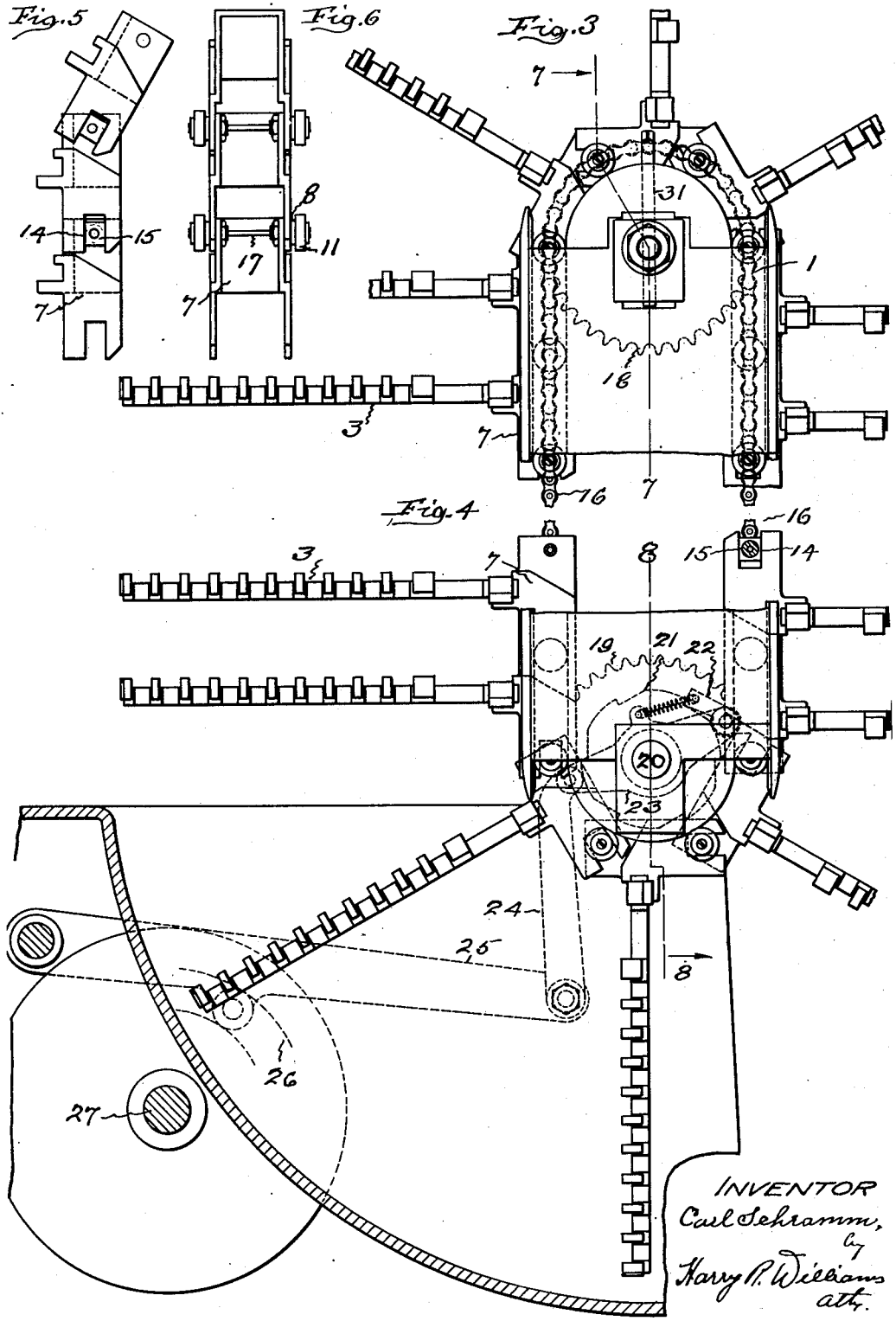

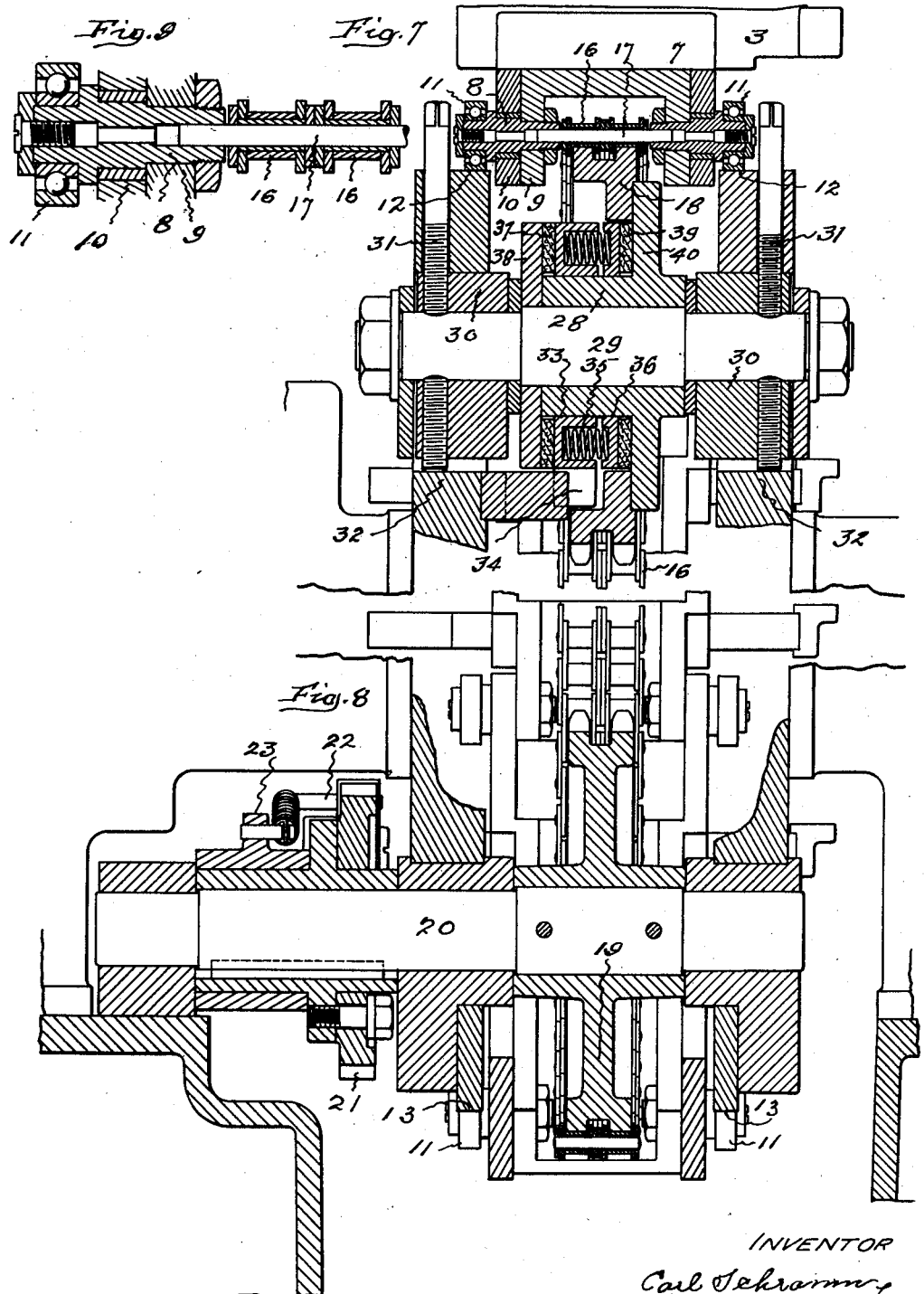

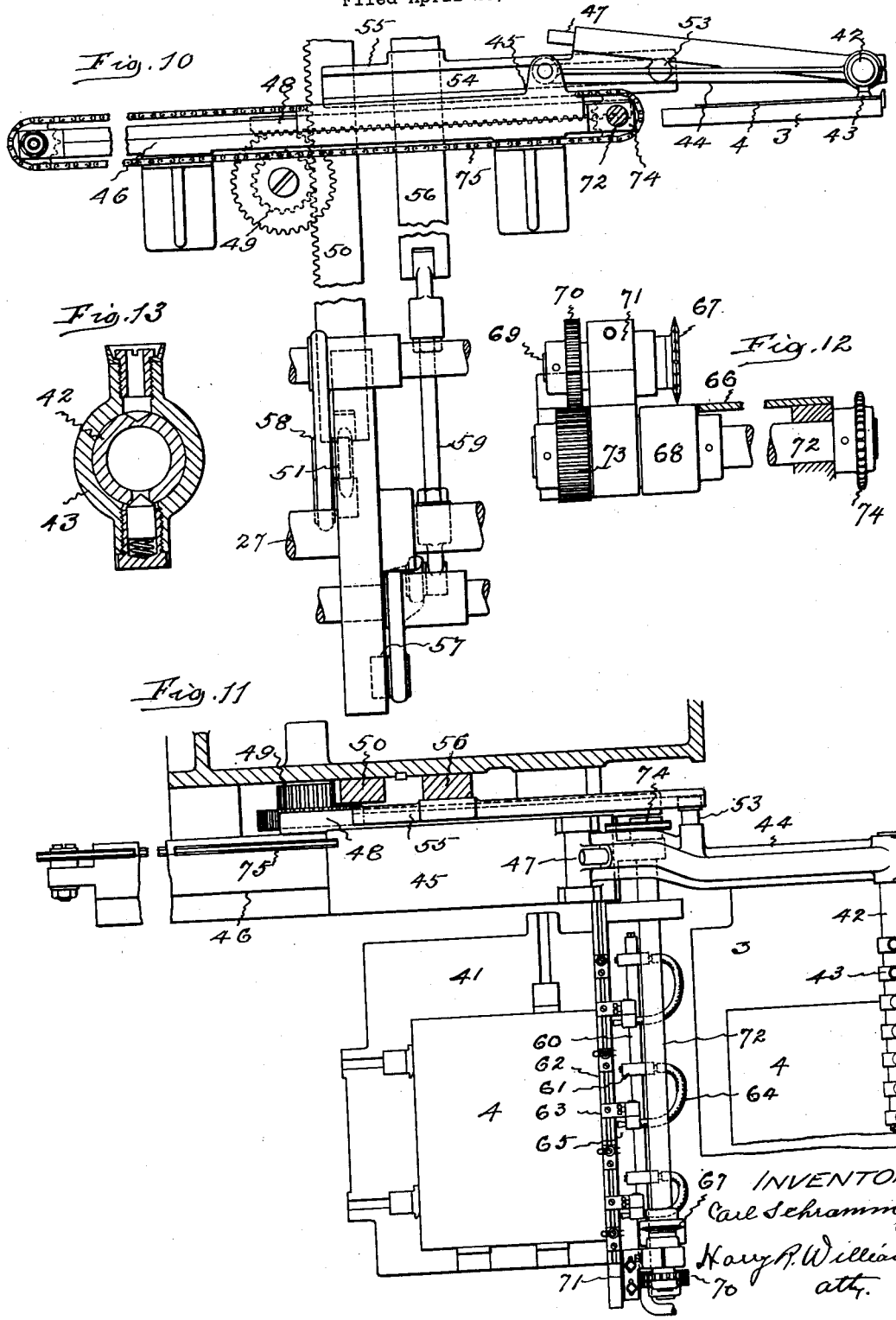

Oct. 28, 1941.  C. SCHRAMM  2,260,540
COLLATING MACHINE
Filed April 28, 1941   13 Sheets-Sheet 6
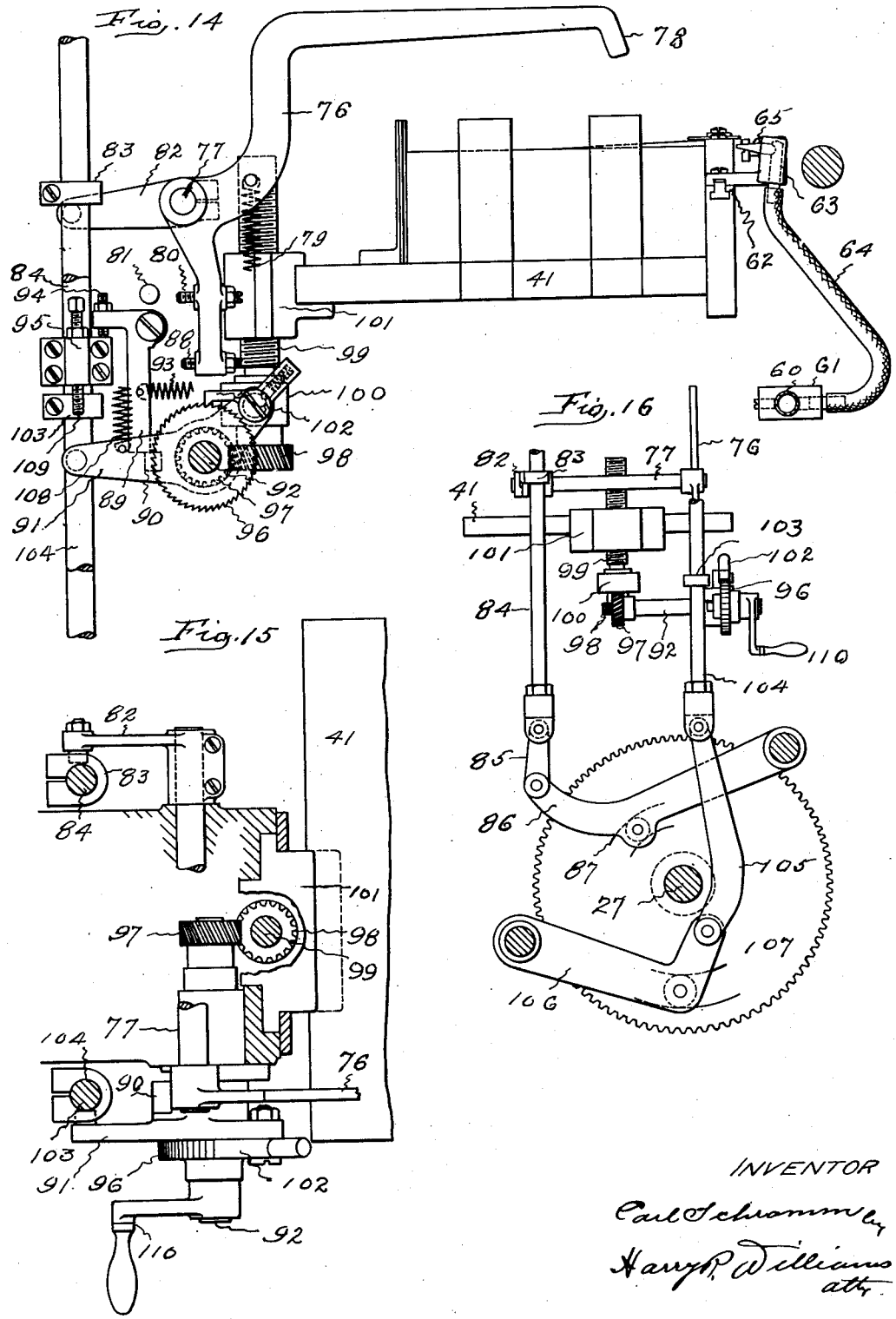
INVENTOR
Carl Schramm
Harry P. Williams
atty.

Oct. 28, 1941.   C. SCHRAMM   2,260,540
COLLATING MACHINE
Filed April 28, 1941   13 Sheets-Sheet 7
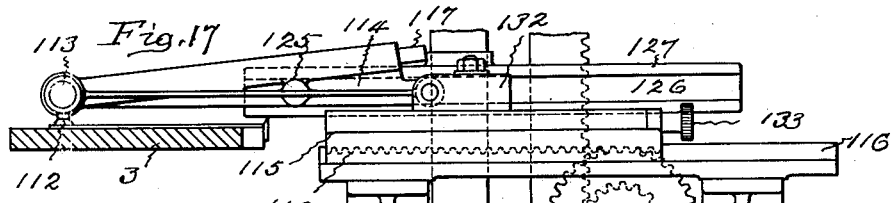
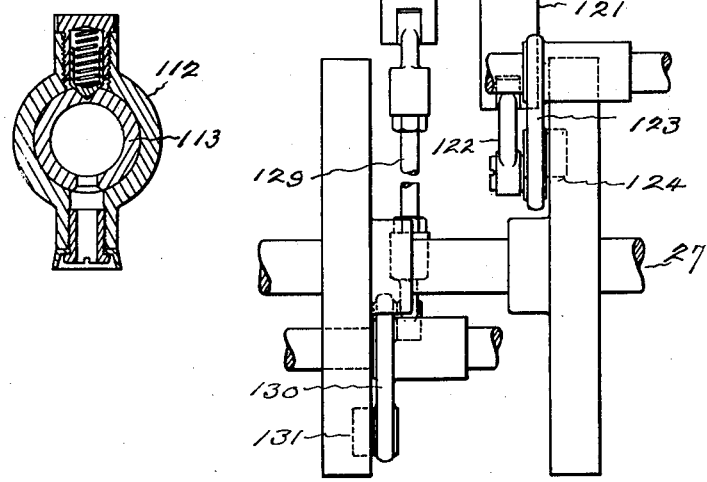
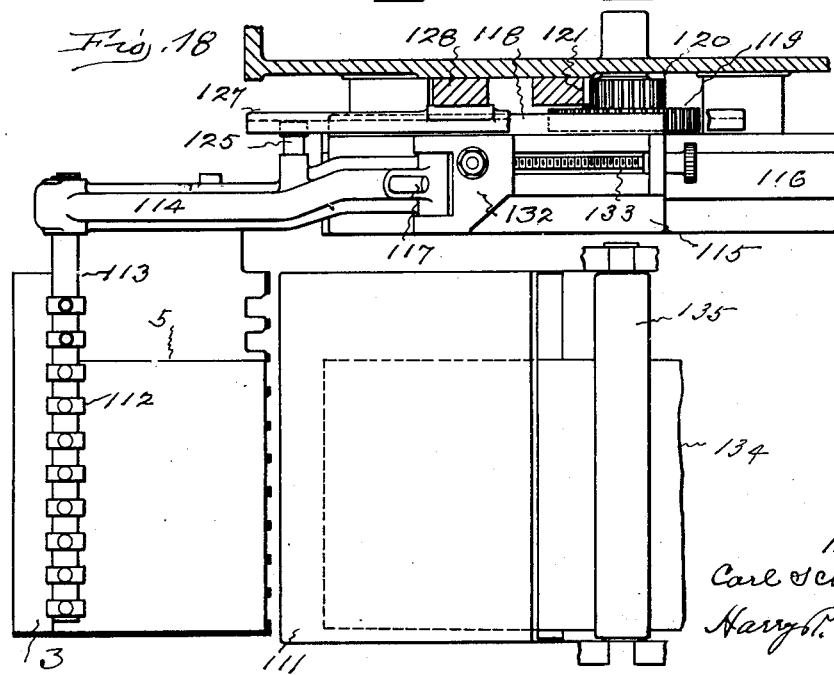
INVENTOR
Carl Schramm
by Harry P. Williams
atty.

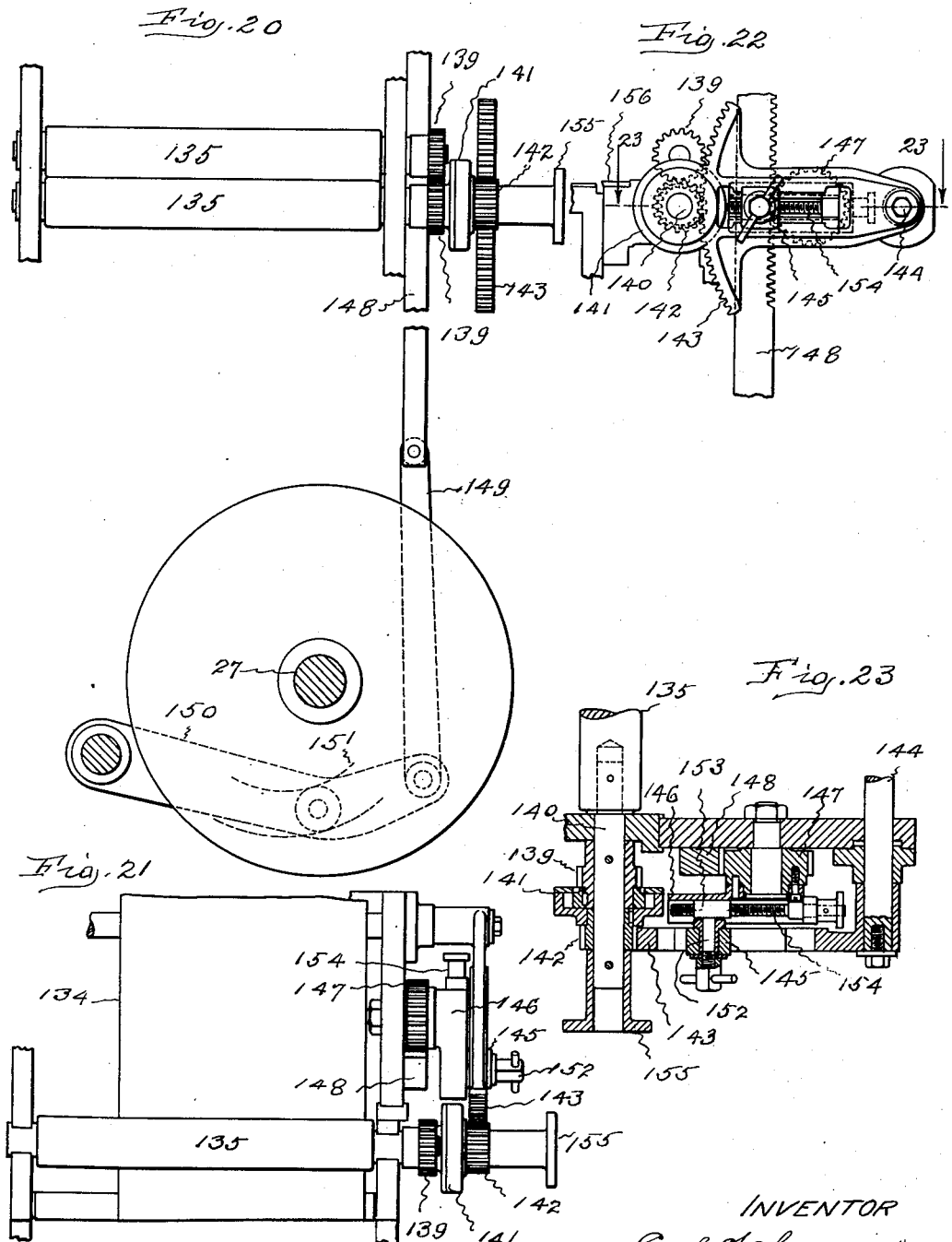

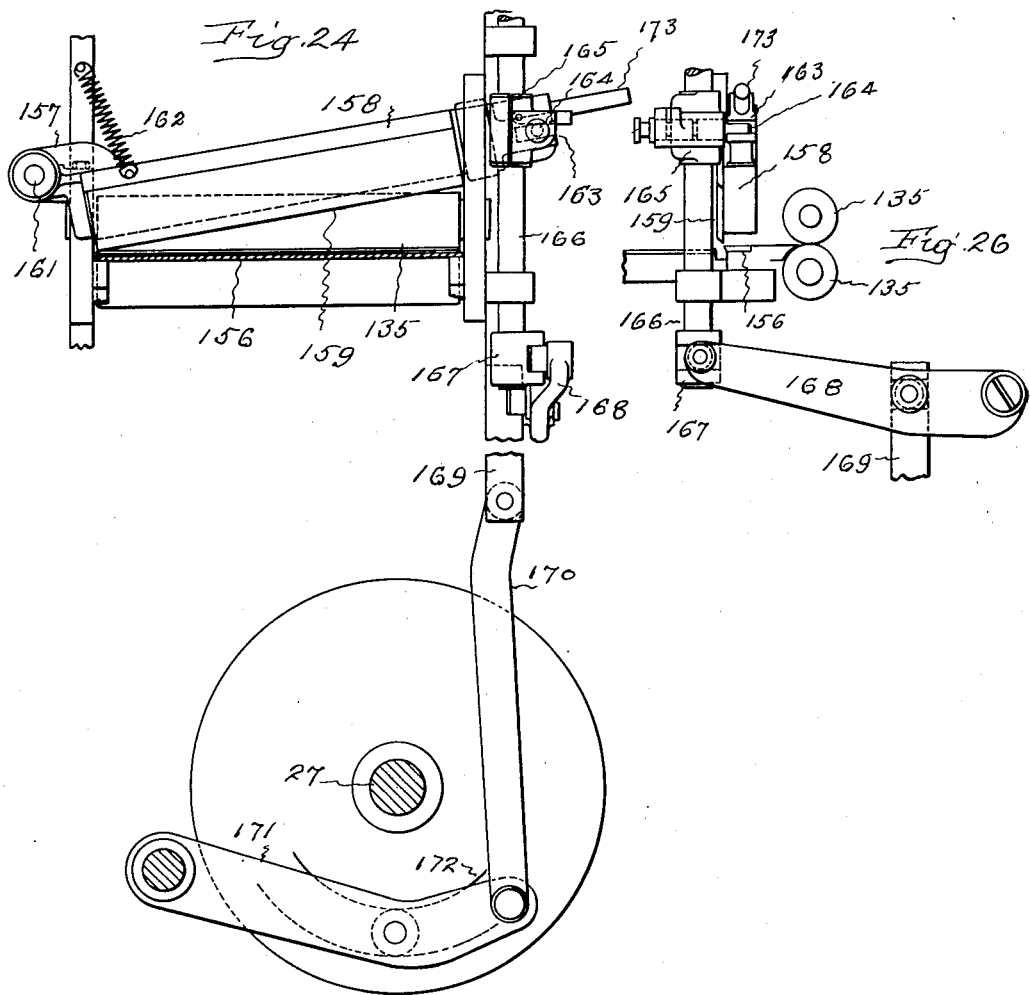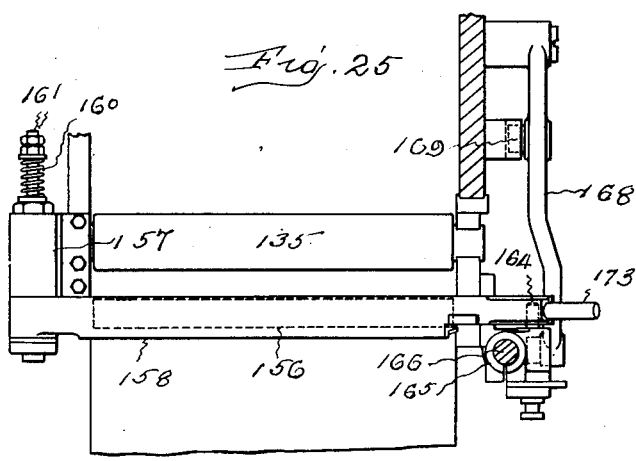

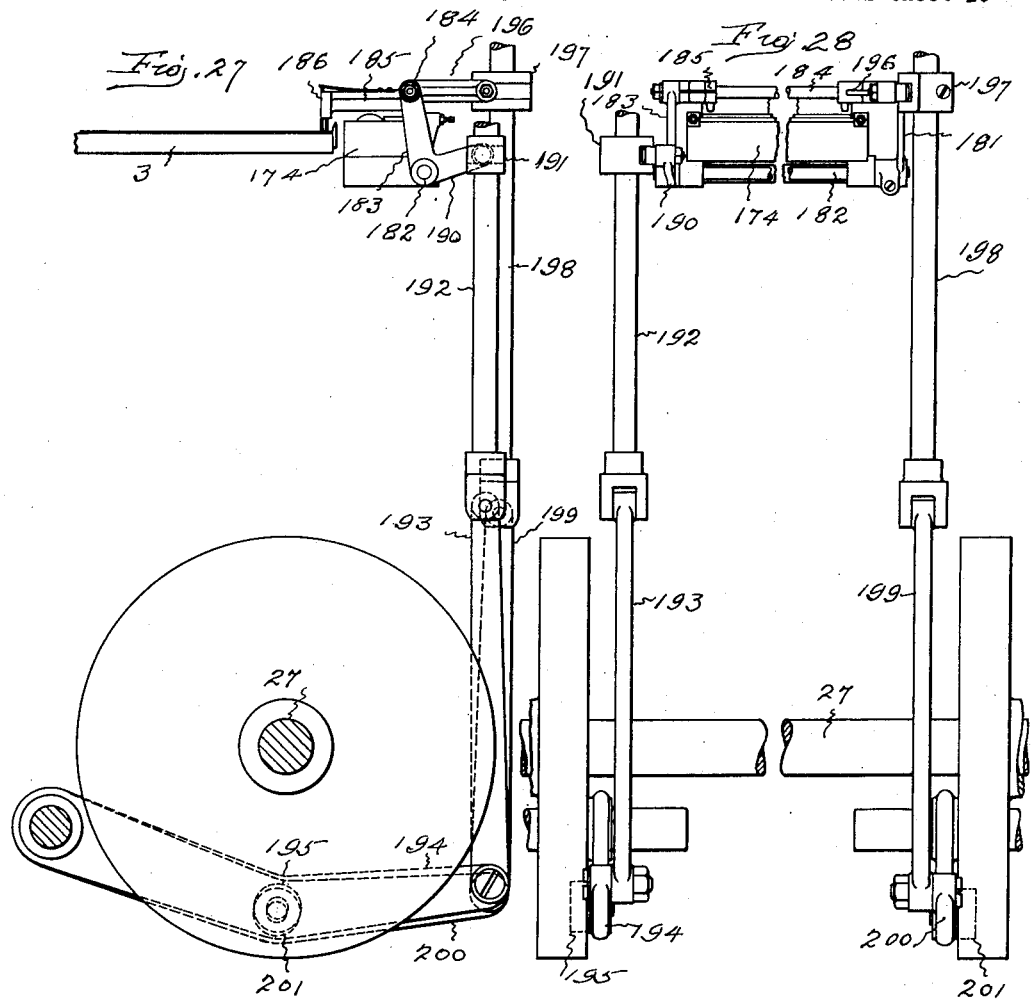

Oct. 28, 1941.   C. SCHRAMM   2,260,540
COLLATING MACHINE
Filed April 28, 1941   13 Sheets-Sheet 11
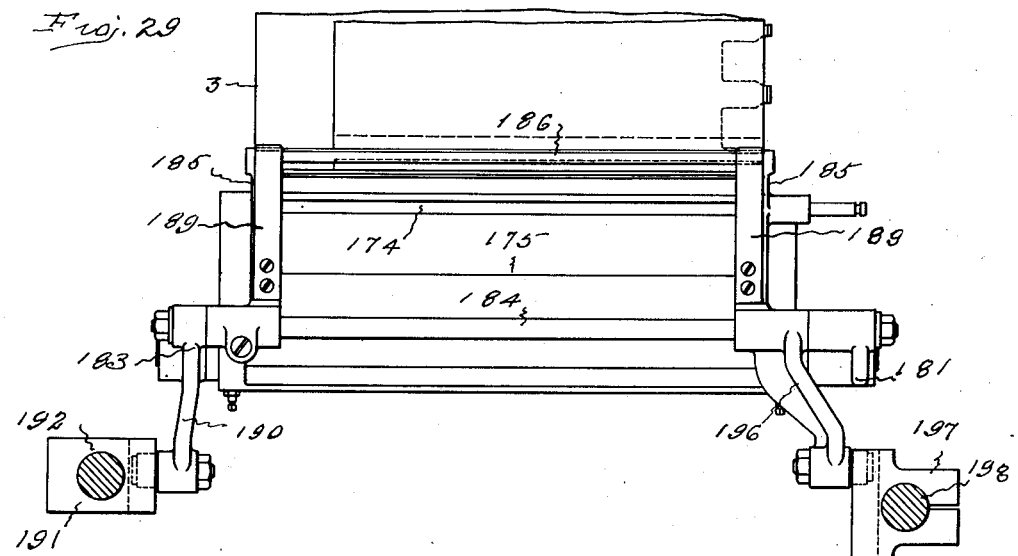
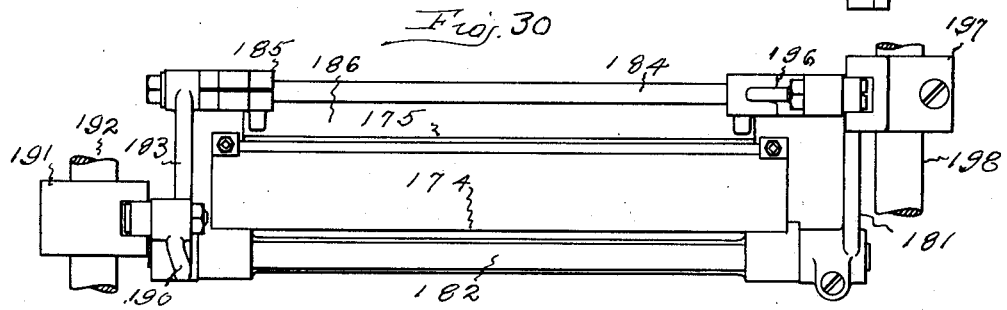
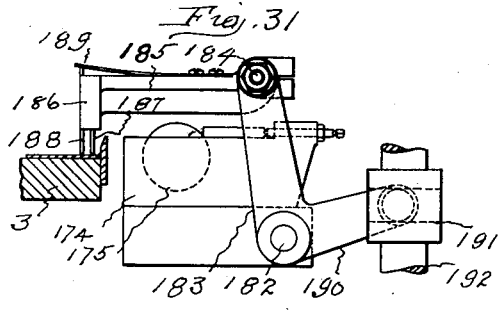
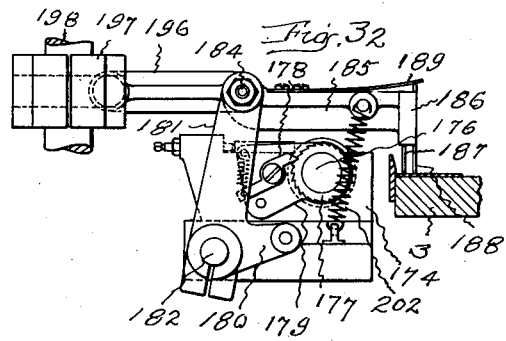
INVENTOR
Carl Schramm
by Harry P. Williams
atty

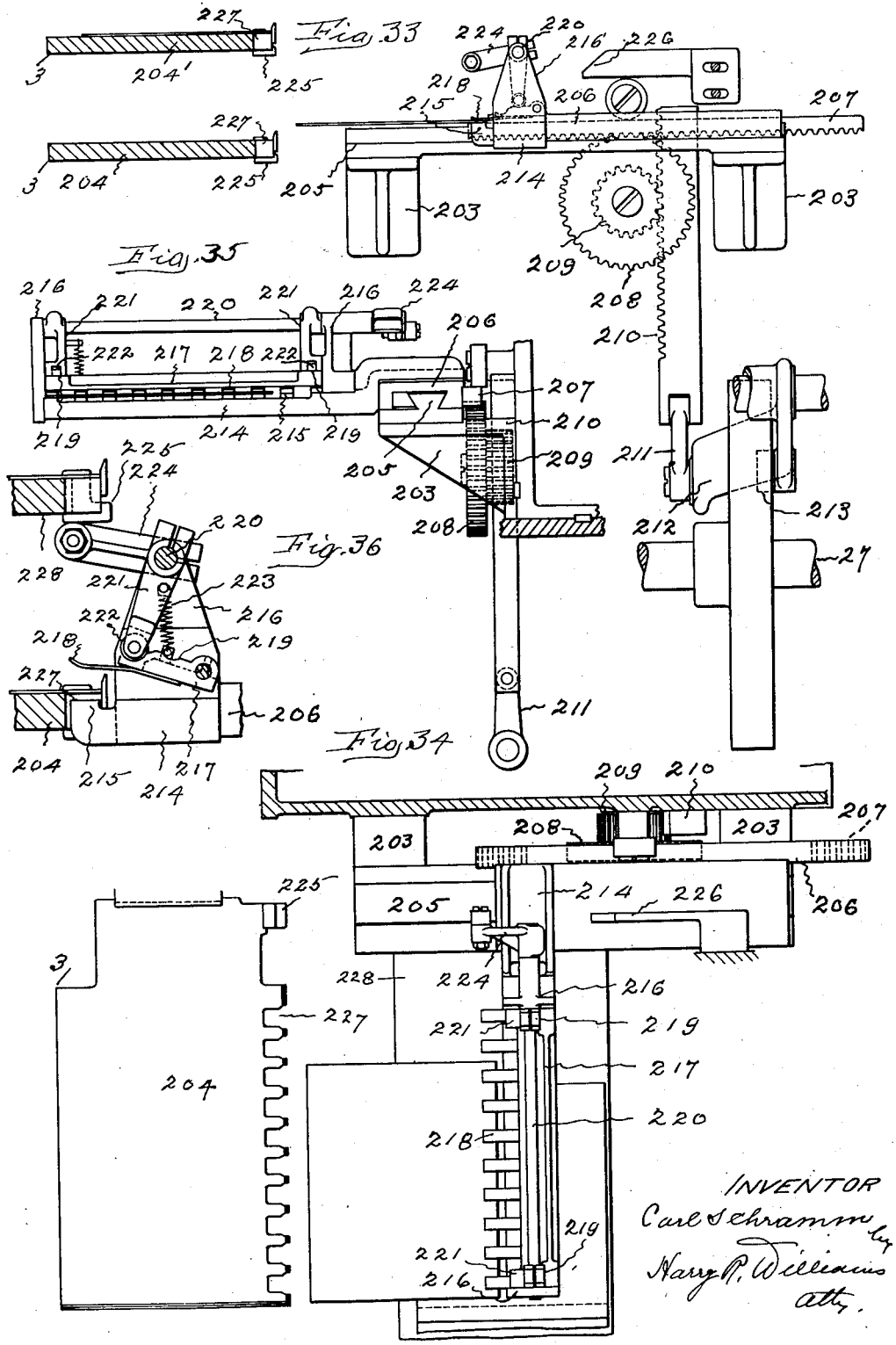

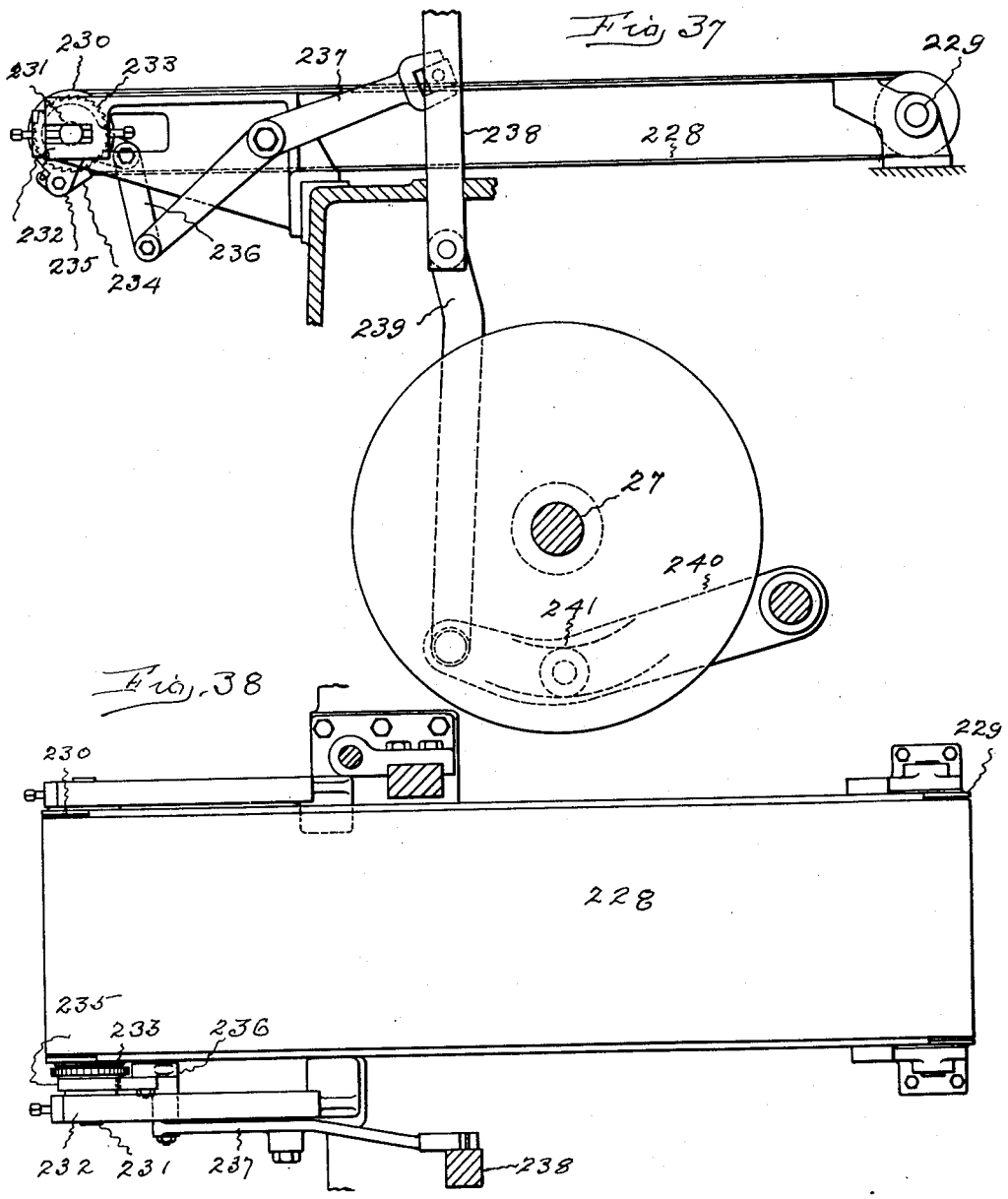

Patented Oct. 28, 1941

2,260,540

UNITED STATES PATENT OFFICE 2,260,540

COLLATING MACHINE

Carl Schramm, North Coventry, Conn., assignor to The Smyth Manufacturing Company, Hartford, Conn., a corporation of Connecticut Application April 28, 1941, Serial No. 390,771

42 Claims. (Cl. 270—52)

This invention relates to a machine which collates or collects and interposes sheets of paper and carbon sheets and forms them into pads for commercial and industrial manifold service where several copies of records are desired.

The object of the invention is to provide a comparatively simple machine that will occupy but a small floor space and which will with precision, speed and without waste automatically pick up, transfer and superpose alternately in accurate relation flat sheets of paper and carbon sheets, the paper sheets being scored so that they may be easily detached, and the necessary sheets being pasted and pressed along one edge so that they will adhere, and then discharge in pad form, the mechanisms being so designed and cooperatively arranged that with the possible simple adjustments, any desired number of paper sheets of ordinary commercial sizes of the same or different colors or textures, with similar or varying printings, rulings and numberings, and the necessary number of carbon sheets of the same or different lengths, widths and outlines as the paper sheets, may be secured into a single pad, or into a plurality of pads at one cycle of the machine.

In attaining this object the machine illustrated, broadly, has a step by step vertically movable continuous conveyor with shelves for receiving paper and carbon sheets. Located one above the other at one side of the downward path of the conveyor shelves are a plurality of tables designed to support stacks of the paper sheets and means arranged to pick up the top sheets of the paper stacks and score and transfer them onto the conveyor shelves. Means are provided for automatically raising the tables in order to keep the top sheets of paper at normal operative level. Located at the other side of the downward path of the conveyor and arranged one above the other alternately in height with relation to the paper tables are a plurality of tables for supporting strips of carbon paper which are drawn from rolls and sheared to the desired lengths. Cooperating with the carbon feeding and shearing mechanism are means which transfer the cut carbons from the tables onto the paper sheets which have previously been deposited on the conveyor shelves. Adjacent to the shelves of the conveyor are means which apply paste to the sheets near their top edges. There are no means for feeding, shearing and transferring carbon strips, and no pasting means opposite the lowest conveyor shelf upon which paper sheets are deposited, as the last paper sheet delivered becomes the front sheet of the finished pad, but there is means for pressing the pasted top edges of the sheets to ensure their adhesion. On the carbon side are means for withdrawing the completed pad from the lowest used conveyor shelf and discharging it onto a belt conveyor. The several mechanisms are connected with the same driving mechanism and perform their functions synchronously and deliver finished pads continuously. If all the sheets are to be united into single pads all of the pasting means are utilized, but by rendering inoperative one or more of the pasting means a plurality of pads may be produced simultaneously.

In the accompanying drawings Fig. 1 shows diagrammatically a front elevation of the machine. Fig. 2 is a plan view of the same. Fig. 3 shows on larger scale a side elevation of the upper portion of the sheet receiving conveyor. Fig. 4 is a similar view of the lower portion of the conveyor. Fig. 5 is a side view of a short length of the articulated blocks of the conveyor chain. Fig. 6 is a front view of these blocks. Fig. 7 is, on larger scale, a vertical section of the upper portion of the conveyor taken on the dotted line 7—7 on Fig. 3. Fig. 8 is a similar section of the lower portion of the conveyor on line 8—8 on Fig. 4. Fig. 9 is, on still larger scale, a section showing means for connecting the conveyor blocks and driving chain. Fig. 10 shows a side elevation of the paper transfer and a portion of the scoring mechanisms. Fig. 11 is a plan view of the same. Fig. 12 is a side elevation on larger scale of the scoring means. Fig. 13 is an enlarged section of a paper suction nozzle. Fig. 14 is a side elevation of the paper supply control. Fig. 15 is a plan view of the same with parts broken away. Fig. 16 shows on smaller scale, an elevation of the operating mechanism of the paper supply control. Fig. 17 shows a side elevation of the carbon transfer mechanism with the carbon table omitted. Fig. 18 shows a plan view of the carbon transfer means. Fig. 19 shows a section on enlarged scale of a carbon suction nozzle. Fig. 20 shows a side elevation of the carbon strip feeding mechanism. Fig. 21 shows a top view of the same. Fig. 22 shows a front view of the feeding means, with the actuating mechanism omitted. Fig. 23 is a horizontal section on plane denoted by dotted line 23—23 on Fig. 22. Fig. 24 shows a side elevation of the carbon strip shearing mechanism. Fig. 25 shows a top view of the same. Fig. 26 shows a front view of the shearing mechanism with the actuating means omitted. Fig. 27 is a side elevation of the pasting mechanism. Fig. 28 is a front view of the same. Fig. 29 is on larger scale a top view of the pasting mechanism. Fig. 30 is a front view of the same. Fig. 31 is a view looking from the left of Fig. 30. Fig. 32 is a view looking from the right of Fig. 30. Fig. 33 is a front elevation of the mechanism for removing the finished pads from the conveyor. Fig. 34 is a top view of the same. Fig. 35 is a side elevation of the pad removing means. Fig. 36 is a larger view illustrating the action of the removal gripping fingers. Fig. 37 is a side elevation of the mechanism for delivering the removed pads. Fig. 38 is a top view of the same.

The machine which is illustrated as an embodiment of the invention has a vertically traveling endless-chain conveyor 1 located at approximately the middle of the frame 2 and mechanism for imparting step by step movements to the conveyor. The conveyor has outwardly extending shelves 3 onto which, when they are in horizontal position at the front of the machine and as the conveyor dwells between its downward movements, sheets of paper 4 and carbon 5 to produce the pads 6 are alternately transferred. The machine shown is designed to produce pads comprised of six sheets of paper and five interposed sheets of carbon, therefore the conveyor will dwell twelve times with the shelves in service position, six for receiving paper sheets, five for receiving carbon sheets and one, the lowest, in pad delivery position.

The conveyor and its operating mechanism is illustrated in detail in Figs. 3–9. The inner ends of the conveyor shelves 3 are secured to blocks 7 which are channeled on their inner sides and are hinged together by tubular hubs 8 that extend through the channel side walls 9, 10. Fig. 7. On the outer ends of the hubs are rolls 11 which run on circular tracks 12, 13, fixed at the top and bottom of the frame so as to support the load of the conveyor and pads. The loose end of each block has a fork 14 which embraces a sleeve 15 that is mounted on the pivoting hub of the block in advance, Fig. 5, to provide connections which allow the blocks to turn on their pivots when looping around the upper and lower tracks but retain the blocks in line when in the vertical stretches.

A double roller chain 16 of common construction is shown as employed for communicating movement to the shelf blocks. At the proper intervals pins 17 which connect the chain links are extended into the hubs which hinge the blocks. Fig. 7. The links of the chain are engaged by the teeth of an upper sprocket wheel 18 and a lower sprocket wheel 19. The lower sprocket wheel is secured on a horizontal shaft 20 on which a ratchet wheel 21 is also secured. Engaging the teeth of the ratchet wheel is a pawl 22 carried by a pawl lever 23 which is connected by a link 24 with a lever 25 that is oscillated by a cam 26 on the cam shaft 27 so as to cause the pawl and ratchet wheel to turn the lower sprocket wheel and advance the chain at the required intervals. Fig. 4.

The upper sprocket wheel around which the top loop of the chain passes has a hub 28 that turns freely on a horizontal axle 29 which is supported by bearings 30 that may be adjusted up and down by means of screws 31 which pass vertically through the upper tracks 12 and the bearings 30 and abut against fixed parts 32 of the frame. Fig. 7. By turning these screws the upper sprocket wheel and tracks may be raised to take up slack in the chain. To prevent momentum incident to the movement of the conveyor from carrying the shelves beyond the required distance when they are advanced by the chain, a retarding friction brake is provided. This brake comprises a socketed disk 33 that is held from rotation by a fixed lug 34 and that has in the sockets springs 35 so interposed between the disk and a cooperating shoe 36 that the disk is pressed against a packing 37 backed by a fixed plate 38, and the shoe is pressed against a packing 39 that is backed by the flange 40 which extends from the rotatable sprocket hub. Fig. 7.

There may be any desired number of paper tables 41 on which the sheets of paper are stacked and cooperating with each table is a transfer unit, which units are similar in construction and arrangement and which function in unison. Six paper transfer units are shown one above the other on the left side of the conveyor.

A paper transfer mechanism is illustrated in detail in Figs. 10 and 11. Each paper transfer has a forwardly extending tubular arm 42 which at intervals has radial perforations. Rotatably mounted on this arm are a plurality of suction nozzles 43 that have openings toward the table designed to register with the perforations through the tube when the nozzles are turned to one position, and to be out of register with the tube perforations when the nozzles are turned to another position, Figs. 13 and 19. The rear end of the arm 42 is connected to a lever 44 that is pivotally attached to a slide 45 which is capable of horizontal reciprocation on a fixed track 46. The lever has a duct 47 that communicates with the opening in the arm 42 and that is adapted to be connected with any well known means for drawing air from the arm and suction nozzles. Horizontal movement is imparted to the slide by a rack 48 attached to the slide and gears 49 meshing with the rack and engaged by a vertically movable rack 50 that is actuated through suitable connections 58 by a cam 51 on the cam shaft 27, a sufficient distance to carry the arm and suction nozzles from the edge of a paper table 41 over a conveyor shelf 3. The vertically movable rack 50 extends upward sufficiently to engage with the gears 49 of each of the paper transfer slides so that all the suction arms will be reciprocated horizontally in unison. The lever 44 has a stud 53 that projects into a horizontal groove 54 in a bar 55 which is secured to a vertical bar 56 that is given a short movement up and down by suitable connections 59 with a cam 57 on the cam shaft. The vertical movement of the bar 56 raises and lowers the grooved horizontal bar 55 and this, by means of the stud and groove connection swings the lever 44 and the arm 42 with the suction nozzles up and down without interfering with their horizontal travel. The vertical bar 56 extends vertically a sufficient distance to carry a horizontal bar 55 so located as to engage with each of the suction arm levers 44 and thus all of the paper suction nozzles will be raised and lowered in unison. The actuating mechanisms are so timed that the suction nozzles at one limit of their horizontal movements are given a vertical movement and caused to pick up from the tables 41 edges of sheets of paper 4 and then given a horizontal movement to draw the sheets picked up over shelves 3 of the conveyor where the nozzles are lowered and the sheets deposited on the conveyor shelves.

Positioned adjacent to and extending parallel with the edges of the sheets of paper stacked on the tables 41 are tubes 60 that are adapted to be connected with any common type of blower. On these tubes are blocks 61 that have passages which communicate with the interior of the tubes. Adjustably attached to a bar 62 are blocks 63 that have passages which at one end are connected by flexible tubes 64 with the passages in the blocks 61 and at the other end are provided with nozzles 65, Fig. 11. The flexible tubes allow the nozzles to be moved to different localities and directed in the desired direction toward the stacks of paper so that air drafts projected from the nozzles will cause the edges of the top sheets, that are to be engaged and picked up by the suckers, to be separated to such an extent that only one sheet at a time will be lifted from each table 41 and transferred to a conveyor shelf 3, Figs. 11, 14.

As a sheet of paper is lifted from each table 41 and is transferred to a conveyor shelf 3 by the suckers 43 it is drawn across a fixed plate 66 and between a pair of scoring rolls 67, 68, which are so located one above the other at the front of the machine between the table and shelf that they will score the sheet near its front edge. The upper roll 67 is in the form of a disk with a notched edge for producing the score, while the lower roll 68 is in the form of a cylinder which acts as a bed, Fig. 12. The disk is secured to an end of a short shaft 69 which at its other end has a gear 70. The bearing block 71 of this shaft is adjustably attached to the frame so as to permit the axial position of the disk along the surface of the cylinder to be changed and thus the distance of the score from the top edge of the sheet to be varied. The cylinder shaft 72 at its front end has a gear 73 that meshes with the gear 70 and at its rear end has a sprocket wheel 74 which meshes with a chain 75 that has its ends connected with the opposite ends of the sucker transfer slide 45, Figs. 10, 11, so that the scoring rolls will rotate together at the same peripheral speed as the paper travels while being transferred to the conveyor shelf.

As the tops of the stacks of paper sheets on the tables are lowered by the repeated withdrawals of sheets by the sucker arms the tables upon which the sheets are stacked are raised, there being similar elevating means provided for each paper table. Mechanism for this purpose is illustrated in detail by Figs. 14-16.

To accomplish this there is an angular feeler lever 76 attached to the front end of a shaft 77 which extends horizontally front and back at one side above each table. At one end the feeler lever has a finger 78 that is adapted to be oscillated into and out of engagement with the top sheet of the stack. A spring 79 tends to pull the finger down toward the stack, and a screw 80 carried by a limb of the lever and a stud 81 projecting from the frame cooperate to limit the downward movement of the finger, Fig. 14. Attached to the rear end of the shaft 77 is an arm 82 which is engaged by a collar 83 that is adjustable on a vertically reciprocated rod 84 which is connected by a link 85 with a lever 86 that is oscillated by a cam 87 on the cam shaft 27, Fig. 16. This rod continues past all of the paper tables and has a collar positioned to engage each arm. When the rod is drawn down the collar pushes the arm down and causes the finger to be lifted, and as the rod and collar are raised the spring pulls the finger down. If the height of the stack is normal the finger engages the top sheet of the stack and the lever has only a short oscillation. As the level of the top of the stack lowers the distance of the downward movement of the finger increases until a trip screw 88 carried by a limb of the feeler lever engages a latch 89 that is pivoted to the frame, and pushes the end of the latch from a catch stud 90 which projects from an angular pawl lever 91 that is pivotally mounted on a horizontal shaft 92. A spring 93 tends to pull the latch into engagement with the catch, and a stop screw 94 carried by the latch is adjusted to engage a fixed bracket 95 for limiting the distance of engagement of the latch with the catch. Secured to the front end of the shaft 92 is a ratchet wheel 96 and secured to the rear end is a spiral gear 97 that meshes with a spiral gear 98 which is secured to the lower end of a vertically arranged elevating screw 99 that extends through a fixed hub 100 and is threaded through a vertically movable slide 101 which carries a paper table. One limb of the pawl lever 91 carries a pawl 102 that engages the teeth of the ratchet wheel 96 and the other limb of the pawl lever is adapted to be engaged by a collar 103 that is adjustable on a vertically reciprocated rod 104 which is connected by a link 105 to a lever 106 that is oscillated by a cam 107 on the cam shaft 20. The rod 104 continues past all of the paper tables and has a collar 103 positioned to engage each pawl lever 91. When the latch is pushed from the catch a spring 108 pulls the pawl lever so as to retract the pawl and carry the end of the lever into the path of the collar on the vertically reciprocated rod. The distance of retraction of the pawl is determined by the adjustment of the screw 109 which is turned through the fixed bracket 95. As long as the latch is released from the catch, each time that rod 104 moves downward its collar engages the end of a pawl lever and pushes it in such a way that the pawl will advance the ratchet wheel, and thus turn the ratchet shaft and through the spiral gears and elevating screw raise the table. The table is elevated until the downward movement of the finger at the end of the feeler lever is so limited by the top sheet of paper that the trip screw which the feeler lever carries will not engage the latch. When the paper level reaches normal and the feeler lever is not oscillated sufficiently for the trip screw to engage the latch the latch is drawn back over the catch and holds the pawl lever so that it will not be engaged and oscillated by the vertical movements of its actuating rod and collar. With such elevating means located adjacent to each table the top sheets of the stacks of paper on the tables are sustained at the proper levels to be picked up and transferred by the sucker arms. By adjusting the vertical positions on the rod 104 of the collars 103 which engage the pawl levers 91 the distance of advance of the pawls may be varied, and by adjusting the screws 109 threaded through the fixed brackets the distance of retraction of the pawls may be varied and thus the ratchet wheels turned a greater or less degree according to the distance the paper tables must be raised to have the top sheets at the proper levels to be picked up by the transfer suckers. The pawls 102 are pivotally connected with the pawl levers in such manner that they may be turned out of engagement with the teeth of the ratchet wheels, and the shafts upon which the ratchet wheels are secured may be provided at the front with crank handles 110 by means of which the tables may be moved manually up or down when the pawls are disengaged from the ratchet wheels.

The mechanisms for transferring the carbon sheets from the carbon tables 111 to the conveyor shelves 3 are located vertically on the right side of the conveyor path and are practically the same as the paper transfer mechanisms with which they alternate in vertical position but act simultaneously. There is one less carbon transfer unit than paper transfer unit as the first and last sheets of the pads are paper. These mechanisms are illustrated in detail by Figs. 17–19.

The suction nozzles 112 are mounted on a tubular arm 113 the rear end of which is connected with a lever 114 that is pivotally attached to a slide 115 which is capable of horizontal reciprocation on a fixed track 116. This lever has a duct 117 that communicates with the opening in the arm and is adapted to be connected with means for drawing air from the arm and suction nozzles. Horizontal movement is imparted to the slide by means of a rack 118, that is secured to the slide and is engaged by a gear 119 on an arbor which has a gear 120 that is engaged by a vertically movable rack 121, the rack 121 being connected by link 122 and lever 123 with cam 124 on the cam shaft 27. The lever 114 has a stud 125 that projects into a horizontal groove 126 in a bar 127 which is secured to a verticaly movable bar 128, the vertical bar being conneced by link 129 and lever 130 with cam 131 on the cam shaft. The vertically movable rack 121 extends upward sufficiently to engage the gears 120 of each carbon transfer, and the vertically movable bar 128 extends upward a sufficient distance to carry a horizontal bar 127 so located as to engage each carbon transfer lever 114. By means of these mechanisms all of the carbon sheet suckers are given vertical and horizontal movements for picking up carbon sheets from the carbon tables and transferring them to and delivering them onto the conveyor shelves.

To allow for the transfer of carbon sheets of different lengths the levers 114 that carry the arms 113 and suction nozzles 112 are pivotally connected to blocks 132 which are movably attached to the slides 115 and that are capable of longitudinal adjustment along the slides by means of screws 133 which are carried by the slides and are threaded into the blocks. By means of this adjustment while the transfer suction nozzles always travel the maximum distance they may be located so as to engage the advance ends of different lengths of the carbon sheets that are on the carbon tables and transfer the sheets onto the conveyor shelves and leave the sheets with their trailing edges always in the same position. There are a sufficient number of suction nozzles on each arm to engage carbon sheets of maximum width. If the sheets are less than the maximum width the nozzles which are not engaged with the carbons are put out of action by reversing them on the arms, two being reversed and out of service being shown in Fig. 18.

Strips of carbon paper 134 of the desired width are drawn by feed rolls 135 from spools 136 placed on axles 137 that project from brackets 138 secured to the frame, and laid on the carbon tables 111 where the ends are cut off to produce sheets 5 of the desired lengths for transfer to the conveyor shelves 3. Details of the feeding mechanism are illustrated by Figs. 20–23.

The feed rolls are supported one above the other by bearings in the frame and are provided with intermeshing pinions 139 so that they will rotate together at the same speed. The hub of the lower pinion is secured on an arbor 140 and also to one member of a one way roller clutch 141, and secured to the other member of this clutch is a pinion 142 which is engaged by a segmental rack 143 that is pivoted on an arbor 144. Movable in an opening in the shank of the segmental rack is a crank block 145 that is adjustably connected with a crank 146. Secured to this crank is a gear 147 that is engaged by a vertical rack 148 which extends past all of the carbon tables and at its lower end is connected by a link 149 with a lever 150 that is oscillated by cam 151 on crank shaft 27. By this mechanism all of the carbon feed rolls may be rotated to feed carbon strips onto the carbon tables coincidently. As the length of the carbon sheets may vary the distance of feed of the strips is varied accordingly. To provide for such variation of feed the connection of the crank with the segmental rack is capable of radial adjustment. In the arrangement illustrated the crank block 145 is mounted on a stud 152 which has a head 153 that is located in a slot in the crank, and a screw 154 carried by the crank is threaded through the head of the stud. By turning this screw the distance of the crank block 145 from the pivot 144 of the segmental rack 143 may be adjusted so that the effective swing of the segmental rack will feed the desired length of carbon strip. The end of the arbor 140 is provided with a handle 155 by means of which the feed rolls may be manually turned.

After the carbon strips have been fed by the feed rolls onto the carbon tables, the fed ends are sheared to produce sheets of the desired lengths. The shearing mechanism is illustrated in detail by Figs. 24–26.

Supported by and extending between sections of the frame at each carbon table in advance of the feed rolls 135 is a fixed shearing blade 156, and pivoted at one end to a bracket 157 that is secured to a section of the frame is an oscillatory bar 158 which carries a shearing blade 159. A spring 160 is arranged between the pivotal bearing bracket 157 and nuts on a headed rod 161 by means of which the alignment of the cutting edges of the shearing blades may be regulated, and a spring 162 is connected between the oscillatory blade bar and the frame to cushion the downward movements of the bar and blade and assist their upward movements. The swinging end of the pivoted blade bar has a fork 163 and projecting from the side into this fork is a pin 164 that is capable of longitudinal movement in a sleeve 165 secured on a vertically movable rod 166. The lower end of this rod has a collar 167 that is engaged by a lever which is connected by links 169, 170 with a lever 171 that is oscillated by a cam 172 on the cam shaft 27. By this mechanism the pivoted blade is drawn down, following each feed of a carbon strip onto a carbon table, and severs the length of carbon which is to be transferred to the conveyor, and is lifted after each cut. By drawing the pin 164 out from the forked end of oscillatory blade bar the bar may be disconnected so that it will not be oscillated by the vertically moving rod, and then by grasping the handle 173 the shearing blade can be operated manually or can be held out of operative position by the spring 162.

After each sheet of paper and carbon, except the last sheet of paper, has been transferred to the conveyor shelves paste is applied to the upper surface near the top edge so that the sheets will adhere. The pasting mechanism is illustrated in detail by Figs. 27–32.

Supported by the frame at the front of the machine and opposite each used conveyor shelf 3, except the lowest, upon which the paper and carbon sheets are alternately deposited, is a tank 174 for containing paste. In this tank is a roll 175 the shaft 176 of which at one end outside of the tank has a ratchet wheel 177 that is engaged by a pawl 178 which is mounted on a pawl lever 179. The pawl lever is arranged to be engaged by an arm 180 of an angle lever 181 for advancing the pawl and ratchet and turning the paste roll in the tank. The angle lever 181 is fastened to one end of a rock shaft 182 that extends horizontally beneath the tank, and an angle lever 183 is fastened to the other end of the rock shaft 182. A rock shaft 184 which extends horizontally above the tank is pivotally supported by the upper ends of the levers 181 and 183. Secured to the rock shaft 184 near the angle levers are arms 185 and connecting the outer ends of these arms is a bar 186 which carries a pad 187 that extends downwardly from the bar across the front of the tank. The bar 186 also carries near each end a plate 188 that is pressed downward by springs 189.

The lever 183 has a limb 190 that is engaged by a slotted collar 191 on a vertical shaft 192 which is connected by link 193 with lever 194 that is oscillated by cam 195 on cam shaft 27. The upward and downward movements of the shaft 192 oscillate the lever 183 and impart a general horizontal movement to the arms 185 and bar 186 which carries the pad 187 and plate 188. Extending from the arm 185 at one side of the tank is an arm 196 that is engaged by a slotted collar 197 on a vertical shaft 198 which is connected by link 199 with lever 200 that is oscillated by a cam 201 on the cam shaft 27. The vertical movements of the shaft 198 oscillate the arms 185 and impart upward and downward movements to the bar 186 which carries the pad 187 and plate 188. The mechanisms are so arranged and the cams so timed that the paste pad in its upward position is carried into contact with the paste roll and then over the edge of the sheets on the conveyor shelf where it is lowered into engagement with the sheets to apply paste thereto. A spring 202 is arranged to ensure the necessary pressure of the pad on the sheet. The paste pad is then raised and returned to the roll for gathering more paste. The yielding plate 188 engages the sheets in advance of the engagement of the paste pad and following the lifting of the pad, so as to prevent the displacement of the sheets and hold them down until the paste pad has risen therefrom. The shafts 192 and 198 extend upward past the several pasting means so that all will be actuated in unison. As stated no paste is applied to the last sheet of paper fed on to a conveyor shelf as that sheet forms the front of the finished article, therefore at this locality the paste tank is omitted but a plate is employed for pressing the pasted sheets together.

At the station reached by a conveyor shelf below the station at which the last paper sheet is applied and a pad completed, the pad is removed from the conveyor, the mechanism for accomplishing this being illustrated in detail by Figs. 33–36.

Supported horizontally by brackets 203 secured to the frame and located at the right of the conveyor and approximately opposite the lowest used shelf 204 is a track 205. Movable on this track toward and from the conveyor path is a slide 206 attached to which is a horizontal rack 207. Engaging this rack is a gear 208 that is connected to a gear 209 which is engaged by a vertical rack 210 that is connected by a link 211 with a lever 212 adapted to be oscillated by a cam 213 on the cam shaft 27. Secured to the slide and extending forwardly over the carbon table 111 is an arm 214 that has rigid teeth 215 which project toward the conveyor path. Near the ends of the arm 214 are upwardly extending ears 216, and between and pivotally supported thereby is a plate 217. Secured to the under side of this plate are spring fingers 218 that project outward over the rigid teeth 215 of the arm 214. On the top of the plate and near each end are cam surfaces 219.

Supported by the ears is a rock shaft 220 and secured to this shaft above the cam surfaces are downwardly projecting rocker arms 221 that have rolls 222 which are adapted to engage the cam surfaces. A spring 223 tends to swing up the plate 217 and open the spring fingers from the rigid teeth on the arm 214 and also retain the cam surfaces in engagement with the rocker rolls. At the rear end of the rock shaft 220 is a rocker arm 224 with a roll which is carried into the path of projections 225 from the conveyor shelves when the slide 206 and arm 214 are advanced, and is carried into engagement with a fixed wedge 226 when the slide and arm are retracted. By means of this mechanism the slide and arm are carried forward with the spring fingers retained open from the rigid teeth on the arm until they span the finished pad on the conveyor shelf 204. The edges of the conveyor shelves have notches 227 which allow the teeth and fingers to span the edge of the pad and also allow the conveyor shelves to pass them. As the conveyor moves downward the conveyor shelf 204' above that upon which the finished pad lies engages the rocker arm 224 and turns the rocker arms 221 in such manner that their rolls run up on the cam surfaces 219 and force the plate down and hold the spring fingers so that the pad will be tightly gripped between the spring fingers and rigid teeth on the arm. As the slide and arm are retracted the pad is drawn from the conveyor shelf and at the end of the return movement the rocker 224 engages the fixed wedge arm 226 and turns the rocker arms 221 so that the rolls 222 free the plate and allow the spring fingers to open and drop the pad.

As the completed pads are dropped by the discharge mechanism they fall upon a belt which carries them away from the machine. Such a removing mechanism is illustrated in detail by Figs. 37, 38. This mechanism comprises an endless belt 228 which travels around an idle drum 229 and a driven drum 230 spaced apart the desired distance. The driven drum is fastened on a shaft 231 that is adjustably mounted in a bracket 232 secured to the frame. Attached to the shaft is a ratchet wheel 233 engaging with which is a pawl 234 carried by a lever 235 that is pivoted on the shaft. The pawl lever is connected by a link 236 with a lever 237 that is connected by links 238, 239 with a lever 240 which is oscillated by cam 241 on the cam shaft 27. By this mechanism the belt is moved a step after each movement of the conveyor, or after it receives a pad from the conveyor.

This machine can be built with any desired number of units for transferring and scoring paper sheets arranged one above the other at one side of the endless conveyor and at the other side of the conveyor one above the other, one less in number, units for feeding, shearing and transferring carbon sheets. The carbon sheets may be any length and width, and the edges of the paper and carbon sheets pasted together to form a single pad at each cycle of the machine, or by rendering inoperative one or more carbon feed units and corresponding pasting units several pads of fewer sheets may be produced at each cycle of the machine.

For brevity and to readily distinguish the materials handled and the elements by which the materials are manipulated, the specification and claims use the terms "paper" and "carbon." It is to be understood, however, that instead of "carbon" sheets, duplicating sheets of other character than carbon, or sheets of tissue, may be supplied as inserts, the substance of the invention set forth herein being the mechanism set forth and not the specific materials mentioned.

The invention claimed is:

1. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, and mechanism for imparting step by step vertical movements to said conveyor and causing the conveyor shelves to dwell in succession opposite a paper transfer and then opposite a carbon transfer, whereby sheets of paper and carbon will be superposed alternately on conveyor shelves.

2. The machine described in claim 1 characterized in that the mechanism for imparting step by step vertical movements to the conveyor comprises an endless chain, sprocket wheels meshing with said chain, and cam actuated ratchet and pawl means for intermittently advancing said chain.

3. The machine described in claim 1 characterized in that said conveyor comprises an endless chain, articulated blocks pivotally connected to said chain and shelves carried by and projecting from said blocks.

4. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, and mechanism for imparting step by step vertical movements to said conveyor a distance equal to the vertical distance between said paper tables and carbon tables.

5. The machine described in claim 4 characterized in that the mechanism for imparting step by step vertical movements to the conveyor comprises an endless chain, sprocket wheels meshing with said chain, cam actuated ratchet and pawl means for intermittently advancing one of said sprocket wheels, and a friction brake engaging one of said sprocket wheels and restraining the advance movements of said sprocket wheels and chain.

6. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, mechanism connecting said paper and carbon transferring means and causing them to function simultaneously, and mechanism for imparting step by step vertical movements to said conveyor and causing the conveyor shelves to dwell in succession opposite a paper transfer and then opposite a carbon transfer.

7. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, suction means for lifting and transferring sheets from the paper tables onto conveyor shelves, suction means for lifting and transferring sheets from the carbon tables onto conveyor shelves, and mechanism for imparting step by step vertical movements to said conveyor and causing the conveyor shelves to dwell in succession opposite a paper transfer and then opposite a carbon transfer.

8. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, a plurality of reciprocating suction means for transferring sheets from the paper tables onto conveyor shelves, means connecting and reciprocating all of said paper suction transferring means coincidently, means for transferring sheets from the carbon tables onto conveyor shelves, and mechanism for imparting step by step vertical movements to said conveyor and causing the conveyor shelves to dwell in succession opposite a paper transfer and then opposite a carbon transfer.

9. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, a plurality of reciprocating suction means for transferring sheets from the carbon tables onto conveyor shelves, means connecting and reciprocating all of said carbon suction transferring means coincidently, mechanism for imparting step by step vertical movements to said conveyor and causing the conveyor shelves to dwell in succession opposite a paper transfer and then opposite a carbon transfer.

10. A machine as described in claim 7 characterized by having mechanism for transversely reciprocating said paper and carbon transferring means and mechanism cooperating therewith for raising and lowering said paper and carbon transferring means at the limits of their transverse movements.

11. A machine as described in claim 7 characterized by having said paper and carbon transferring means carried by levers that are pivoted to horizontally movable slides, vertically movable horizontal tracks and slidable connections between said levers and said horizontal tracks.

12. A machine as described in claim 7 characterized by having said paper and carbon transferring means comprised of levers pivoted to horizontally movable slides, horizontal racks on said slides, gears in mesh with the horizontal racks, vertical racks engaging said gears, cams and connections for reciprocating said vertical racks, vertical bars, cams and connections for reciprocating said bars, horizontal tracks carried by said bars, and sliding connections between said levers and said tracks.

13. A machine as described in claim 7 characterized by having paper and carbon transferring means comprised of levers, tubular arms extending from said levers, said arms having a plurality of transverse perforations, and suction cups rotatable on said arms, said cups having radial openings that in one position of the cups communicate with the perforations in the arms and in another position of the cups are cut off from the perforations in the arms.

14. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, suction means for lifting and transferring sheets from the paper tables onto conveyor shelves, means for initially separating the sheets on the paper tables so that the suction means will lift and transfer but a single sheet at a time, suction means for lifting and transferring sheets from the carbon tables onto conveyor shelves, and mechanism for imparting step by step vertical movements to said conveyor and causing the conveyor shelves to dwell in succession opposite a paper transfer and then opposite a carbon transfer.

15. A machine as described in claim 14 characterized by having ducts with openings adjacent to and extending parallel with the paper tables, and means for blowing air from said openings against the edges of the paper on said tables and causing the initial separation of the top sheets from those below.

16. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for scoring the paper sheets as they are transferred from the tables to conveyor shelves, means for transferring sheets from the carbon tables onto conveyor shelves, and mechanism for imparting step by step vertical movements to said conveyor and causing the conveyor shelves to dwell in succession opposite a paper transfer and then opposite a carbon transfer.

17. The machine described in claim 16 characterized in that said scoring means comprises bed rolls and impression rolls cooperating therewith, and intermeshing gears for rotating said rolls in unison.

18. The machine described in claim 16 characterized in that said scoring means comprises cylindrical bed rolls, and impression disks cooperating therewith, said impression disks being adjustable axially with relation to the bed rolls.

19. The machine described in claim 16 characterized in that said scoring means comprises rolls geared together and driven by sprocket wheels which are engaged by chains that are connected with, and are drawn back and forth by the horizontal movements of, the paper transferring means.

20. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, mechanism for elevating the paper tables as the sheets are transferred therefrom, means for transferring sheets from the carbon tables onto conveyor shelves, and mechanism for imparting step by step vertical movements to said conveyor and causing the conveyor shelves to dwell in succession opposite a paper transfer and then opposite a carbon transfer, whereby sheets of paper and carbon will be superposed alternately on conveyor shelves.

21. A machine as described in claim 20 in which the mechanism for elevating the paper tables comprises screws connected with the tables, gears adapted to turn said screws, ratchet and pawl means for rotating said gears, and a vertically reciprocating rod with collars for advancing said pawls.

22. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, mechanism for elevating the paper tables as the sheets are transferred therefrom, mechanism responsive to the height of the top sheets on the paper tables for controlling the table elevating mechanism, means for transferring sheets from the carbon tables onto conveyor shelves, and mechanism for imparting step by step vertical movements to said conveyor and causing the conveyor shelves to dwell in succession opposite a paper transfer and then opposite a carbon transfer.

23. A machine as described in claim 22 in which the mechanism for elevating the paper tables comprises screws connected with the tables, gears adapted to turn the said screws, ratchets and pawls for rotating said gears, a vertically reciprocating rod and collars adapted to actuate said ratchets and pawls, latches normally retaining said ratchets and pawls from being actuated, and levers adapted to contact the top sheets of paper on the tables and when the top sheets are below normal height to engage said latches and cause them to release said ratchets and pawls and allow them to rotate the gears and raise the tables.

24. A machine as described in claim 22 in which the mechanism for elevating the paper tables comprises screws connected with the tables, gears adapted to turn the said screws, ratchets and pawls for rotating said gears, a vertically reciprocating rod and collars adapted to actuate said ratchet and pawls, latches normally retaining said ratchets and pawls from being actuated, levers and mechanism for oscillating said levers into contact with the top sheets of paper on the tables and means carried by said levers and adapted to engage said latches and cause them to release said ratchets and pawls and allow them to rotate the gears and raise the tables when the top sheets of paper are below normal height.

25. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for feeding carbon strips onto the carbon tables, means adjacent to said strip feeding means for shearing the strips into sheets, means for transferring said carbon sheets from the carbon tables onto conveyor shelves, and mechanism for imparting step by step vertical movements to said conveyor and causing the conveyor shelves to dwell in succession opposite a paper transfer and then opposite a carbon transfer.

26. A machine as described in claim 25 characterized by having the means for feeding carbon strips onto the carbon tables comprised of rolls, intermeshing gears for rotating said rolls, intermeshing pinions and segmental racks for rotating said roll gears, gears connected to said segmental racks and a vertically reciprocated rack bar engaging said last mentioned gears.

27. A machine as described in claim 25 characterized by having the means for feeding carbon strips onto the carbon tables comprised of rolls, intermeshing gears for rotating said rolls, intermeshing pinions and segmental racks for rotating said roll gears, a crank arm, means adjustably connecting said crank arm to said segmental racks, gears connected to said crank arm and a vertically reciprocated rack bar engaging said last mentioned gears.

28. A machine as described in claim 25 characterized by having the means for shearing carbon strips comprised of fixed shear blades and pivoted shear blades, located in proximity to the carbon feeding means, and mechanism for intermittently oscillating said pivoted blades.

29. A machine as described in claim 25 characterized by having the means for shearing carbon strips comprised of fixed shear blades and pivoted shear blades, located in proximity to the carbon feeding means, a vertically reciprocating rod, detachable means connecting the free ends of the pivoted shear blades to said rod, a cam and levers and links actuated by said cam for intermittently reciprocating said rod.

30. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, means for applying paste to the upper surfaces near the edges of the sheets deposited on the shelves, and mechanism for imparting step by step vertical movements to said conveyor and causing the conveyor shelves to dwell in succession opposite a paper transfer and then opposite a carbon transfer.

31. A machine as described in claim 30 characterized by having the means for applying paste to the sheets comprised of boxes for containing paste located adjacent to the conveyor shelves, rolls turning in said boxes, pads extending parallel to the axes of the rolls, and cam actuated levers and links for carrying said pads from contact with said rolls into engagement with the upper surfaces of sheets on the conveyor shelves.

32. A machine as described in claim 30 characterized by having the means for applying paste to the sheets comprised of boxes for containing paste located adjacent to the conveyor shelves, rolls turning in said boxes, pads extending parallel to the axes of the rolls, cam actuated levers and links for carrying said pads from contact with said rolls into engagement with the upper surfaces of sheets on the conveyor shelves, and yielding sheet retaining means arranged adjacent to and movable with the pads into engagement with the sheets on the conveyor shelves engaged by the pads.

33. A machine as described in claim 30 characterized by having the means for applying paste to the sheets comprised of boxes for containing paste located adjacent to the conveyor shelves, rolls turning in said boxes, pads extending parallel to the axes of the rolls, spring pressed plates located adjacent to and parallel with the pads, levers carrying said pads and plates, and cam actuated levers and links for swinging said carrying levers and causing the pads to contact said rolls and the pads and plates to be carried into engagement with sheets on the conveyor shelf, the edges of said plates normally extending downward below the edges of said pads and retaining the sheets on the shelves until the pads are disengaged from the sheets.

34. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, means for applying paste to the upper surfaces near the edges of the sheets as they are deposited on the shelves, means for pressing the pasted areas following the transfer to the shelves of the last sheets of paper, and mechanism for imparting step by step vertical movements to said conveyor and causing the conveyor shelves to dwell in succession opposite a paper transfer and then opposite a carbon transfer.

35. A machine as described in claim 34 characterized by having means for pressing the pasted areas comprised of a plate, located adjacent to and extending across the lowest used conveyor shelf, a lever carrying said plate, a cam, and levers and links connecting said cam with the plate carrying lever and adapted to swing said plate over and down onto, and up and away from said conveyor shelf.

36. A collating machine comprising a vertically positioned endless conveyor having projecting shelves, a plurality of paper supporting tables located one above the other at one side of the path of said shelves, a plurality of carbon supporting tables located one above the other at the other side of the path of said shelves, said paper tables and carbon tables alternating in height, means for transferring sheets from the paper tables onto conveyor shelves, means for transferring sheets from the carbon tables onto conveyor shelves, mechanism for imparting step by step vertical movements to said conveyor and causing the conveyor shelves to dwell in succession opposite a paper transfer and then opposite a carbon transfer, whereby sheets of paper and carbon will be superposed alternately on conveyor shelves, and means for gripping the superposed sheets and removing them from the shelves following the transfer thereto of the last sheet of paper.

37. The machine described in claim 36 characterized in that the means for removing the superposed sheets from the conveyor shelves comprises a slide movable toward and from the conveyor path, means carried by the slide and adapted to grip said sheets, means for opening said gripping means, and means carried by the conveyor shelves and adapted to engage and close said gripping means on said sheets.

38. The machine described in claim 36 characterized in that the means for removing the suprposed sheets from the conveyor comprises a slide movable toward and from the conveyor path, means carried by the slide and adapted to grip said sheets, means carried by the conveyor shelves and adapted to engage and close said gripping means on said sheets, means for opening said gripping means and releasing said sheets, and an endless belt for receiving said released sheets.

39. The machine described in claim 36 characterized in that the means for removing the superposed sheets from the conveyor shelves comprises a slide, an arm having teeth along its advance edge carried by said slide, mechanism for reciprocating the slide and carrying said arm toward and from the path of the conveyor shelves, a plate pivotally mounted on the arm, spring fingers attached to said plate and projecting over said teeth, a spring for opening said fingers from the teeth, a lever carried by the arm, said lever projecting into the path of and adapted to be engaged and turned by the conveyor shelves to close said fingers against said teeth, and means adapted to be engaged by and to turn said lever to allow said fingers to open from the teeth.

40. The machine described in claim 36 characterized in that the means for removing the superposed sheets from the conveyor comprises a slide movable toward and from the conveyor path, means carried by the slide and adapted to grip said sheets, means carried by the conveyor shelves and adapted to engage and close said gripping means on said sheets, means for opening said gripping means and releasing said sheets, an endless belt for receiving said released sheets, and mechanism for imparting step by step movements to said belt, said mechanism being connected with and operating in synchronism with the mechanism for imparting step by step movements to the conveyor.

41. A collating machine comprising a vertically positioned endless conveyor having projecting shelves, a plurality of paper supporting tables located one above the other at the side of the path of said shelves, mechanism for imparting step by step vertical movements to said conveyor and causing the conveyor shelves to dwell in succession opposite paper tables, means for simultaneously transferring sheets from the paper tables onto a plurality of stationary conveyor shelves, and means for scoring said sheets as they are transferred from the tables to the shelves.

42. A collating machine comprising a vertically positioned endless conveyor having projecting shelves, a plurality of carbon supporting tables located one above the other at the side of the path of said shelves, mechanism for imparting step by step vertical movements to said conveyor and causing the conveyor shelves to dwell in succession opposite carbon tables, means for feeding carbon strips onto the carbon tables, means for shearing the fed strips into sheets, and means for simultaneously transferring a plurality of said sheets from the carbon tables onto stationary conveyor shelves.

CARL SCHRAMM.